(12) United States Patent
Compton et al.

(10) Patent No.: US 9,115,266 B2
(45) Date of Patent: Aug. 25, 2015

(54) CARBON NANOTUBE-POLYMER COMPOSITE AND PROCESS FOR MAKING SAME

(71) Applicant: E I DU PONT DE NEMOURS AND COMPANY, Wilmington, DE (US)

(72) Inventors: Owen C Compton, Wilmington, DE (US); Soonjoo Son, Wilmington, DE (US); Leopoldo Alejandro Carbajal, Newark, DE (US); Paul M Andrusyszyn, Winterville, NC (US); Helga R Kuhlmann, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 10 days.

(21) Appl. No.: 13/955,062

(22) Filed: Jul. 31, 2013

(65) Prior Publication Data

US 2015/0034859 A1 Feb. 5, 2015

(51) Int. Cl.
*C08K 7/24* (2006.01)

(52) U.S. Cl.
CPC ........................................ *C08K 7/24* (2013.01)

(58) Field of Classification Search
CPC ........................................................ C08K 7/24
USPC .......................................... 523/222; 524/495
See application file for complete search history.

(56) References Cited

U.S. PATENT DOCUMENTS

| | | | |
|---|---|---|---|
| 5,424,054 A | 6/1995 | Bethune et al. |
| 6,420,047 B2 | 7/2002 | Winckler et al. |
| 6,420,048 B1 | 7/2002 | Wang |
| 6,426,134 B1 | 7/2002 | Lavin et al. |
| 6,900,264 B2 | 5/2005 | Kumar et al. |
| 7,041,372 B2 | 5/2006 | Rhoads et al. |
| 7,153,903 B1 | 12/2006 | Barraza et al. |
| 7,423,084 B2 | 9/2008 | Marissen et al. |
| 7,611,579 B2 | 11/2009 | Lashmore et al. |
| 7,665,149 B2 | 2/2010 | Carbajal et al. |
| 7,745,561 B2 | 6/2010 | Bahr et al. |
| 7,855,001 B2 | 12/2010 | Negandhi et al. |
| 7,932,314 B2 | 4/2011 | Manian et al. |
| 7,968,657 B2 | 6/2011 | Avakian |
| 7,993,620 B2 | 8/2011 | Lashmore et al. |
| 8,015,617 B1 | 9/2011 | Carbajal et al. |
| 8,334,524 B2 | 12/2012 | Demeo et al. |
| 2003/0122111 A1 | 7/2003 | Glatkowski |
| 2005/0087726 A1 | 4/2005 | Anazawa et al. |
| 2007/0216067 A1 | 9/2007 | Bahr et al. |
| 2008/0007890 A1 | 1/2008 | Harmon et al. |
| 2008/0315453 A1 | 12/2008 | Molitor et al. |
| 2009/0075545 A1 | 3/2009 | Lashmore et al. |
| 2010/0021717 A1 | 1/2010 | Manian et al. |
| 2010/0021765 A1 | 1/2010 | Negandhi et al. |
| 2010/0120957 A1 | 5/2010 | Bahr et al. |
| 2010/0193744 A1 | 8/2010 | Avakian |
| 2010/0203328 A1 | 8/2010 | Hochstetter et al. |
| 2010/0210781 A1 | 8/2010 | McAndrew et al. |
| 2010/0324656 A1 | 12/2010 | Lashmore et al. |
| 2011/0021737 A1 | 1/2011 | Tadepalli et al. |
| 2011/0045275 A1 | 2/2011 | Tadepalli et al. |
| 2011/0201731 A1 | 8/2011 | Korzhenko et al. |
| 2011/0251331 A1 | 10/2011 | McAndrew et al. |
| 2011/0260116 A1 | 10/2011 | Plee et al. |
| 2012/0177926 A1 | 7/2012 | Mann et al. |
| 2012/0186742 A1 | 7/2012 | Kang et al. |
| 2013/0094207 A1 | 4/2013 | Negandhi et al. |

FOREIGN PATENT DOCUMENTS

EP 264835 B1 6/1992

OTHER PUBLICATIONS

Bethune, D. S. et al., Coblat-catalysed growth of carbon nanotubes with single-atomic-layer walls, Nature, 1993, pp. 605-607, vol. 363.
Cheng. Qimfeng et al., High mechanical performance composite conductor: multi-walled carbon nanotube sheet/bismaleimide nanocomposites, Advanced Functional Materials, 2009, 19, pp. 3219-3225.
Guo, T. et al, Catalytic growth of single-walled nanotubes by laser vaporization, Chemical Physics Letters, 243, 1995, pp. 49-54.
Iijima, Sumio, Helical microtubules of graphitic carbon, Letters to Nature, vol. 354, Nov. 7, 1991, pp. 56-58.
Thess, Andreas et al., Crystalline ropes of metallic carbon nanotubes, Science, vol. 273, Jul. 26, 1996, pp. 483-487.
U.S. Appl. No. 13/955,028, filed Jul. 31, 2013.

*Primary Examiner* — Edward Cain (57) ABSTRACT

Disclosed herein are processes comprising the steps of providing a porous mat comprising carbon nanotubes having an average longest dimension in the range of 1 micron to 1000 microns, wherein at least a portion of the carbon nanotubes are entangled; contacting the mat with one or more condensation polymer precursors, and optionally a catalyst; polymerizing the one or more polymer precursors in the presence of the mat at a temperature in the range of about 180° C. to about 360° C. to form a nonporous carbon nanotube-polymer composite comprising a mat of carbon nanotubes embedded in a condensation polymer produced from the polymer precursors, wherein the carbon nanotubes are present in the composite in an amount ranging from about 15 weight percent to about 80 weight percent, based on the weight of the carbon nanotubes and the condensation polymer; and optionally, curing the carbon nanotube-polymer composite.

17 Claims, 6 Drawing Sheets

CARBON NANOTUBE-POLYMER COMPOSITE AND PROCESS FOR MAKING SAME

FIELD OF DISCLOSURE

Provided are carbon nanotube-polymer composites comprising a mat of carbon nanotubes embedded in a condensation polymer, and processes for making such composites.

BACKGROUND

Carbon nanotubes have unique electronic and mechanical properties. Incorporation of carbon nanotubes into various polymeric materials can provide new composites having high modulus and strength, as well as low density. Composites containing carbon nanotubes can be useful in a variety of applications, including aerospace applications, electromagnetic shielding, and ballistic protection. Various methods of making composites comprising carbon nanotubes and polymers are known.

U.S. Pat. No. 6,426,134 relates to a single wall carbon nanotube/polymer composite comprising a single wall carbon nanotube having at least one end chemically bonded to a polymer. Also disclosed is a process for producing a single wall carbon nanotube/polymer composite comprising the steps of: (a) contacting single wall carbon nanotubes with an acid, wherein at least a portion of said carbon nanotubes form acid derivatized nanotubes, each of said acid derivatized nanotubes having at least one carboxylic acid attached to at least one end of the nanotube; (b) contacting the product of step (a) with one or more polymer precursors to form a prepolymer product; and (c) polymerizing the pre-polymer product of step (b) to form a single wall carbon nanotube/polymer composite.

U.S. Pat. No. 7,153,903 discloses a method for producing single walled carbon nanotube-filled composites using an in situ polymerization process comprising the steps of: combining single-walled carbon nanotubes with a monomer in the presence or absence of a polymerization catalyst; activating the polymerization catalyst if needed; exposing the mixture to polymerization conditions thereby resulting in a polymer mixture having the single-walled carbon nanotubes highly dispersed therein; thereby forming the single-walled carbon nanotube-filled composite. Also disclosed is a method of forming carbon nanotube-filled composites using miniemulsion polymerization.

Published US Patent Application No. 2010/0210781 discloses a polymer composition which includes carbon nanotubes in a resin matrix such as cyclic butylene terephthalate where the resin matrix is compounded into a polymer matrix.

Published US Patent Application No. 2010/0324656 relates to carbon composites and methods of manufacturing same, and more particularly, to a carbon composite having a relatively high loading of carbon nanotubes. Also disclosed is a method for manufacturing a composite, whereby at least one sheet of non-woven carbon nanotubes or nanofibers may be infiltrated with an appropriate resin.

There is an existing need for improved methods for the preparation of carbon nanotube-polymer composites. There is an existing need for methods of making well-consolidated composites, methods which can be used for the fabrication of large-scale materials in an economical manner.

SUMMARY

Carbon nanotube-polymer composites and processes for making such composites are provided. In one embodiment, a process is provided, the process comprising the steps:

(a) providing a porous mat comprising carbon nanotubes having an average longest dimension in the range of 1 micron to 1000 microns, wherein at least a portion of the carbon nanotubes are entangled;

(b) contacting the mat with one or more condensation polymer precursors, and optionally a catalyst;

(c) polymerizing the one or more polymer precursors in the presence of the mat at a temperature in the range of about 180° C. to about 360° C. to form a nonporous carbon nanotube-polymer composite comprising a mat of carbon nanotubes embedded in a condensation polymer produced from the polymer precursors, wherein the carbon nanotubes are present in the composite in an amount ranging from about 15 weight percent to about 80 weight percent, based on the weight of the carbon nanotubes and the condensation polymer; and (d) optionally, curing the carbon nanotube-polymer composite.

In some embodiments, the condensation polymer comprises a polyester, a polyamide, a polyaramid, or a polyacetal. In some embodiments, the condensation polymer precursor comprises monomers, oligomers, or mixtures of monomers and oligomers.

Also provided is a carbon nanotube-polymer composite made according to the process disclosed herein.

BRIEF DESCRIPTION OF THE FIGURES

The carbon nanotube-polymer composites disclosed herein, and processes for making such composites, are described with reference to the following figures.

DETAILED DESCRIPTION

As used herein, where the indefinite article "a" or "an" is used with respect to a statement or description of the presence of a step in a process of this invention, it is to be understood, unless the statement or description explicitly provides to the contrary, that the use of such indefinite article does not limit the presence of the step in the process to one in number.

As used herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "about" modifying the quantity of an ingredient or reactant employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, preferably within 5% of the reported numerical value.

As used herein, the term "embedded" means firmly enclosed by a surrounding mass.

As used herein, the term "monomer" means a molecule that can combine with others to form a macromolecule containing a large number of repeating units.

As used herein, the term "oligomer" means a linear or cyclic molecule containing from two to about 10 repeating units derived from monomers. As used herein, the term oligomers refers to short chain polymers having relatively low molecular weight in comparison to the molecular weight of the final polymer.

As used herein, the term "condensation polymer" means any polymer that is generated via a condensation reaction in which a small molecule (e.g., water, hydrogen chloride, methanol, etc.) is eliminated during the formation of a covalent bond between two monomers, a monomer and an oligomer, or two oligomers. As used herein, the term "polymer" is intended to include copolymers.

In one embodiment, a process is provided, the process comprising the steps:

(a) providing a porous mat comprising carbon nanotubes having an average longest dimension in the range of 1 micron to 1000 microns, wherein at least a portion of the carbon nanotubes are entangled;

(b) contacting the mat with one or more condensation polymer precursors, and optionally a catalyst;

(c) polymerizing the one or more polymer precursors in the presence of the mat at a temperature in the range of about 180° C. to about 360° C. to form a nonporous carbon nanotube-polymer composite comprising a mat of carbon nanotubes embedded in a condensation polymer produced from the polymer precursors, wherein the carbon nanotubes are present in the composite in an amount ranging from about 15 weight percent to about 80 weight percent, based on the weight of the carbon nanotubes and the condensation polymer; and (d) optionally, curing the carbon nanotube-polymer composite.

In the processes disclosed herein, a porous mat comprising carbon nanotubes is contacted with one or more condensation polymer precursors. As used herein, the term "mat" refers to a nanostructured sheet having a substantially planar form and comprising a plurality of entangled carbon nanotubes. Typically, a mat useful in the processes disclosed herein has a thickness in the range of about 10 microns to about 50 microns. In one embodiment, the thickness is between and optionally including any two of the following values: 10, 15, 20, 25, 30, 35, 40, 45, and 50 microns. Mats with thicknesses outside this range can also be used but may not provide the same physical characteristics as a carbon nanotube-polymer composite comprising a mat with a thickness within the indicated range, or may be less economical to use. Typically, a suitable mat has an areal density in the range of about 5 grams per square meter to about 100 grams per square meter. In one embodiment, the areal density of the mat is between and optionally including any two of the following values: 5, 10, 15, 20, 25, 30, 35, 40, 45, 50 55, 60 65, 70, 75, 80, 85, 90, 95, and 100 grams per square meter. Typically, a suitable mat has a porosity in the range of about 25% to about 85%, for example as measured by mercury intrusion porosity. In one embodiment, the porosity of the mat is between and optionally including any two of the following values: 25, 30, 35, 40, 45, 50, 55, 60, 65, 70, 75, 80, and 85%. A suitable mat can be obtained commercially or can be prepared by methods know in the art, for example by employing a chemical vapor deposition process or similar gas phase pyrolysis procedure to generate carbon nanotubes as disclosed in U.S. Pat. No. 7,611,579 and published patent application US 2012/0177926.

The mat comprises carbon nanotubes having an average longest dimension in the range of about 1 micron to about 1000 microns. In some embodiments, the average longest dimension is between and optionally including any two of the following values: 1, 5, 10, 15, 25, 50, 100, 200, 300, 400, 500, 600, 700, 800, 900, and 1000 microns. The carbon nanotubes comprise single wall nanotubes, multiwall nanotubes, or mixtures thereof. As used herein, a single wall carbon nanotube refers to a hollow carbon fiber having a wall consisting essentially of a single layer of carbon atoms. Single wall nanotube are very flexible and naturally aggregate to form ropes of tubes. Single wall carbon nanotubes can be made by the processes disclosed in Iijima et al., Nature, Vol 363, pl 603 (1993); D. S. Bethune et al., nature 63 (1993) 060, U.S. Pat. No. 5,424,054; R. Smalley et al, Chem. Phys. Letters, Vol. 243 (1995) 49-54 and Science Vol. 273 (1996) 483-487. As used herein, a multiwall nanotube refers to multiple concentric sheets of hollow carbon fibers. Typically, multiwall nanotubes are formed as byproducts of single wall carbon nanotube syntheses.

The carbon nanotubes are entangled, meaning that the nanotubes, or the ropelike structures typically formed by a plurality of nanotubes, are randomly twisted together and randomly overlaid to form a mat. Within a porous mat, openings may exist between adjacent nanotubes, or between the adjacent ropelike structures of nanotubes. These openings are free of carbon nanotubes or other solid material and can have random variations in width and length, providing, for example tortuous channels within a porous mat. The openings provide porosity to the mat of carbon nanotubes, and the amount of the openings in relation to the amount and compactness of the carbon nanotubes can affect the porosity of the mat.

In some embodiments, at least a majority of the carbon nanotubes are disordered, meaning randomly oriented within the mat. In one embodiment, the portion of the carbon nanotubes which are randomly oriented within the mat is between and optionally including any two of the following values: 51, 55, 60, 65, 70, 75, 80, 85, 90, 95, and 100 percent by weight, based on the weight of the mat. In some embodiments, at least a portion of the carbon nanotubes are aligned substantially parallel to one another in the axial direction of the nanotubes. By substantially parallel is meant that the angle formed by two adjacent nanotubes, or ropes of nanotubes, is in the range of about 0 to about 30 degrees, for example about 0 degrees to about 20 degrees, or from about 0 degrees to about 10 degrees, or from about 0 degrees to about 5 degrees. In one embodiment, the portion of carbon nanotubes which are aligned substantially parallel to one another is between and optionally including any two of the following values: 5, 10, 15, 20, 25, 30, 35, 40, 45, 50, 55, 60, 65, 70, 75, 80, 85, 90, 95, and 100 percent by weight, based on the weight of the mat. Methods for aligning carbon nanotubes are disclosed in U.S. Pat. No. 7,611,579 and published patent application US 2009/0075545, for example. In one embodiment, at least a portion of the carbon nanotubes are aligned substantially parallel to one another, within the plane of the mat.

The porous mat comprising carbon nanotubes is contacted with one or more condensation polymer precursors, and optionally a catalyst. Under polymerization conditions, the condensation polymer precursors undergo in situ polymerization to produce a condensation polymer which forms the polymer component of the carbon nanotube-polymer composite. As the polymerization step is performed in the presence of the mat, the mat of entangled carbon nanotubes maintains it nanostructured sheet form and becomes embedded in the condensation polymer, and a nonporous carbon nanotube-polymer composite is formed. The composite is nonporous as a result of the condensation polymer occupying the openings previously present between adjacent nanotubes, or between adjacent ropelike structures of nanotubes, within the mat. In one embodiment, the condensation polymer precursors comprise monomers, oligomers, or mixtures of monomers and oligomers. In one embodiment, the condensation polymer produced from the polymer precursors comprises a polyester, a polyamide, a polyaramid, or a polyacetal. In one embodiment, the condensation polymer comprises a polyester, and the carbon nanotube-polymer composite formed is a carbon nanotube-polyester composite. In one embodiment, the polyester is polybutylene terephthalate. In one embodiment, the condensation polymer comprises a polyamide, and the carbon nanotube-polymer composite formed is a carbon nanotube-polyamide composite. In one embodiment, the condensation polymer comprises a polyaramid, and the carbon nanotube-polymer composite formed is a carbon nanotube-polyaramid composite. In one embodiment, the condensation polymer comprises a polyacetal, and the carbon nanotube-polymer composite formed is a carbon nanotube-polyacetal composite.

In one embodiment, the mat is contacted with condensation polymer precursors comprising a diacid or a diester, and a diol, and the polymer precursors are polymerized in the presence of the mat to form a carbon nanotube-polyester composite. Useful diacid or diester polymer precursors include aliphatic dicarboxylic acids which contain from 4 to 36 carbon atoms, diesters of aliphatic dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. In one embodiment, the aliphatic dicarboxylic acids contain from 4 to 12 carbon atoms. Some representative examples of such aliphatic dicarboxylic acids include glutaric acid, adipic acid, and pimelic acid. In one embodiment, the diesters of alkyl dicarboxylic acids contain from 6 to 12 carbon atoms. In one embodiment, the aryl dicarboxylic acids contain from 8 to 16 carbon atoms. Some representative examples of aryl dicarboxylic acids are terephthalic acid, isophthalic acid, and orthophthalic acid. In one embodiment, the diesters of aryl dicarboxylic acids contain from 10 to 18 carbon atoms. Some representative examples of diesters of aryl dicarboxylic acids include dimethyl terephthalate, dimethyl isophthalate, dimethyl orthophthalate, dimethyl naphthalate, and diethyl naphthalate. In one embodiment, the alkyl substituted aryl dicarboxylic acids contain from 9 to 16 carbon atoms. In one embodiment, the diesters of alkyl substituted aryl dicarboxylic acids contain from 11 to 15 carbon atoms.

Diol polymer precursors useful in preparing a polyester component of the present composite can comprise glycols containing from 2 to 12 carbon atoms, glycol ethers containing from 4 to 12 carbon atoms and polyether glycols having the structural formula HO-$(AO)_n$H, wherein A is an alkylene group containing from 2 to 6 carbon atoms and wherein n is an integer from 2 to 400. Generally, such polyether glycols will have a molecular weight of about 400 to 4000.

In one embodiment, the glycols contain from 2 to 8 carbon atoms. In one embodiment, the glycol ethers contain from 4 to 8 carbon atoms. Some representative examples of glycols which can be employed as a diol polymer precursor include ethylene glycol; 1,3-propylene glycol; 1,2-propylene glycol; 2,2-diethyl-1,3-propanediol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,3-cyclohexanedimethanol; 1,4-cyclohexanedimethanol; and 2,2,4,4,-tetramethyl-1,3-cyclobutanediol. A representative example of polyether glycol is Polymeg® and of polyethylene glycol is Carbowax®.

In another embodiment, the mat is contacted with condensation polymer precursors comprising cyclic oligomers of polyesters, and the polymer precursors are polymerized in the presence of the mat to form a carbon nanotube-polyester composite. Suitable cyclic oligomers of polyesters include cyclic poly(ethylene terephthalate) oligomer, cyclic poly(trimethylene terephthalate) oligomer, and cyclic poly(butylene terephthalate) oligomer. In one embodiment, the condensation polymer precursor comprises cyclic poly(butylene terephthalate) oligomer. In one embodiment, the polymer precursor comprises cyclic poly(butylene terephthalate) oligomer and the polymer precursor further comprises a catalyst for polyester formation. Useful polyester oligomers are commercially available or can be prepared by methods known in the art; see, for example, U.S. Pat. No. 6,420,047.

Useful polyesters for the polymer component of the present composite include for example, poly(butylene terephthalate) (PBT), poly(ethylene terephthalate) (PET), poly(ethylene naphthalate) (PEN), poly(trimethylene terephthalate) (3GT), and poly(trimethylene naphthalate)(3GN).

In one embodiment, the mat is contacted with condensation polymer precursors comprising a diacid and a diamine, and the polymer precursors are polymerized in the presence of the mat to form a carbon nanotube-polyamide composite. The diacid can be selected from aliphatic, alicyclic, or aromatic diacids. Specific examples of such acids include glutaric acid; adipic acid; suberic acid; sebacic acid; dodecanedioic acid; 1,2- or 1,3-cyclohexane dicarboxylic acid; 1,2- or 1,3-phenylene diacetic acid; 1,2- or 1,3-cylohexane diacetic acid; isophthalic acid; terephthalic acid; 4,4'-oxybis(benzoic acid); 4,4'-benzophenone dicarboxylic acid; 2,5-naphthalene dicarboxylic acid; and p-t-butyl isophthalic acid. In one embodiment, the polymer precursor for a carbon nanotube-polyamide composite comprises adipic acid.

Diamine polymer precursors useful in preparing a polyamide component of the present composite can be aliphatic, alicyclic, or aromatic diamines. Specific examples of such diamines include hexamethylene diamine; 2-methyl pentamethylenediamine; 2-methyl hexamethylene diamine; 3-methyl hexamethylene diamine; 2,5-dimethyl hexamethylene diamine; 2,2-dimethylpentamethylene diamine; 5-methylnonane diamine; dodecamethylene diamine; 2,2,4- and 2,4,4-trimethyl hexamethylene diamine; 2,2,7,7-tetramethyl octamethylene diamine; meta-xylylene diamine; paraxylylene diamine; diaminodicyclohexyl methane; and $C_2$-$C_{16}$ aliphatic diamines which can be substituted with one or more alkyl groups. In one embodiment, the polymer precursor for a carbon nanotube-polyamide composite comprises hexamethylene diamine.

Alternative precursors for preparing a polyamide component of a carbon nanotube/polyamide composite include compounds having a carboxylic acid functional group and an amino functional group, or a functional precursor to such a compound, which compounds include 6-aminohexanoic acid, caprolactam, 5-aminopentanoic acid, and 7-aminoheptanoic acid.

In one embodiment, the mat is contacted with condensation polymer precursors comprising an aromatic diacid or an aromatic acyl halide, and an aromatic diamine, and the polymer precursors are polymerized in the presence of the mat to form a carbon nanotube-aramid composite. Useful aromatic diacid or aromatic acyl halide polymer precursors include aryl dicarboxylic acids or acyl halides which contain from 8 to 20 carbon atoms. Suitable aryl dicarboxylic acid or acyl halides include terephthalic acid, terephthaloyl chloride, and terephthaloyl bromide. Aromatic diamine polymer precursors useful in preparing a polyamide component of the present composite include 1,4-phenyl-diamine and 1,3-phenyl-diamine.

In one embodiment, the mat is contacted with condensation polymer precursors comprising formaldehyde, a hemiformal of formaldehyde, trioxane, dioxolane, ethylene oxide, or mixtures thereof, and the polymer precursors are polymerized in the presence of the mat to form a carbon nanotube-polyacetal composite.

The relative amounts of the mat and the condensation polymer precursors are selected to provide a carbon nanotube-polymer composite containing carbon nanotubes in an amount ranging from about 20 weight percent to about 80 weight percent, based on the weight of the carbon nanotubes and the condensation polymer. In some embodiments, the composite contains an amount of carbon nanotubes between and optionally including any two of the following values: 15, 20, 25, 30, 35, 40, 45, 50, 55, 60, 65, 70, 75, and 80 weight percent, based on the weight of the carbon nanotubes and the condensation polymer. In some embodiments, the carbon nanotubes are present in the carbon nanotube-polymer composite in an amount ranging from about 51 weight percent to about 80 weight percent, based on the weight of the carbon nanotubes and the condensation polymer. In some embodiments, the composite contains carbon nanotubes in an amount ranging from about 55 weight percent to about 80 weight percent, based on the weight of the carbon nanotubes and the condensation polymer. In some embodiments, the composite contains carbon nanotubes in an amount ranging from about 35 weight percent to about 75 weight percent, or from about 40 weight percent to about 60 weight percent, based on the weight of the carbon nanotubes and the condensation polymer.

Typically, when two or more polymer precursors are used in the present processes, the relative amounts of each polymer precursor are selected to achieve the desired stoichiometry in the condensation polymer produced. For example, in the case of a carbon nanotube-polyester composite, in one embodiment the condensation polymer precursors can comprise a diacid or diester as the first polymer precursor and a diol as the second polymer precursor, and the relative amounts of the first and second precursors are selected to be approximately equimolar. Amounts within about 10% of the desired equimolar ratio can also be used. Typically, condensation polymer precursors react to provide polymer in essentially quantitative yield. The water or alcohol generated during the condensation polymerization can be removed, for example by performing the polymerizing step at a pressure below atmospheric pressure, or by vaporization at polymerization temperatures. In one embodiment, at least a majority of the water or alcohol produced during the polymerization step is removed during the polymerization.

Optionally, the mat is contacted with one or more condensation polymer precursors in the presence of a catalyst. Suitable catalysts for condensation polymerizations are known in the art and are commercially available. For example, catalysts useful for polyester formation include strong acids, metal oxides and metallorganic complexes, including but not limited to phosphonic acid, $ZrO_2$, and organostannate complexes, respectively. Such catalysts are typically used in amounts ranging from about 0.01 mole percent to about 10 mole percent, for example from about 0.1 mole percent to about 2 mole percent, or from about 0.2 mole percent to about 0.6 mole percent based on total moles of monomer repeat units of the polymer precursor(s). In some embodiments, a catalyst is present in the contacting step and is combined with at least one of the polymer precursors.

When contacted with the mat comprising carbon nanotubes, the condensation polymer precursors can be in a solid form or a liquid or molten form. If used in the solid form, it is desirable for the polymer precursors to be used as finely granulated powders. Mixtures of solid and liquid polymer precursors can also be used. In some embodiments, the polymer precursor has a melt viscosity in the range of about $0.1\ s^{-1}$ to about $10\ s^{-1}$ at a temperature in the range of about 180° C. to about 360° C. In some embodiments, the polymer precursors have a melt viscosity between and optionally including any two of the following values: 0.1, 0.2, 0.3, 0.4, 0.5, 0.6, 0.7, 0.8, 0.9, 1.0, 1.25, 1.5, 2.0, 2.5, 3.0, 3.5, 4.0, 4.5, 5.0, 5.5, 6.0, 6.5, 7.0, 7.5, 8.0, 8.5, 9.0, 9.5, and $10\ s^{-1}$ at a temperature in the range of about 180° C. to about 360° C.

In one embodiment, the step of contacting the mat with one or more condensation polymer precursors can further comprise the steps of dissolving one or more of the condensation polymer precursors in a solvent to form a solution of the one or more polymer precursors, contacting the solution with the mat, and evaporating the solvent to leave the one or more polymer precursors in contact with the mat. In one embodiment, evaporating the solvent is performed prior to polymerizing the polymer precursors. In one embodiment, evaporating the solvent is performed concurrently with polymerizing the polymer precursors.

The condensation polymer precursors are polymerized in the presence of the mat under suitable polymerization conditions to form a nonporous carbon nanotube-polymer composite comprising a mat of carbon nanotubes embedded in the condensation polymer produced from the polymer precursors. Suitable polymerization conditions include sufficient pressure, temperature, time, and other process conditions for polymerization of the polymer precursors to occur. In some embodiments, suitable polymerization conditions can include addition of a catalyst.

In some embodiments, the polymerizing step is performed at a pressure below atmospheric pressure, for example inside a vacuum bag. In some embodiments, the polymerizing step is performed at a pressure above atmospheric pressure. In some embodiments, the pressure is between and optionally including any two of the following values: 170, 200, 300, 400, 500, 600, 700, 800, 900, 1000, 1250, 1500, 1750, 2000, 2250, 2500, 2750, 3000, 3250, 3500, 3750, and 4000 kPa. In some embodiments, the pressure is in the range of about 170 kPa to about 3500 kPa.

In some embodiments, the polymerizing step is performed at a temperature in the range of about 180° C. to about 360° C. Typically, within this temperature range the polymer precursors are in the liquid state and impregnate the mat of carbon nanotubes, so that as the polymer precursors react to form the condensation polymer, the carbon nanotubes become embedded in the condensation polymer and the carbon nanotube-polymer composite is produced. In some embodiments, the temperature is between and optionally including any two of the following values: 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, and 360° C. In some embodiments, the temperature is in the range of about 180° C. to about 250° C. Heating can be provided by various means known in the art, including the use of microwaves.

In some embodiments, the polymerization time is between and optionally including any two of the following values: 2 min, 5 min, 10 min, 15 min, 30 min, 45 min, 60 min, 75 min, 90 min, 105 min, and 120 min. The appropriate amount of time varies depending upon conditions such as temperature, pressure, and the relative amounts of the polymer precursors and the mat of carbon nanotubes, and can be determined by one of ordinary skill in the art.

The present processes can include an optional curing step. After the polymerization step, the carbon nanotube-polymer composite can be cured under suitable processing conditions, if desired. Typically, a curing step is performed in order to increase the molecular weight of the condensation polymer. A curing step can also ensure that the polycondensation reaction is driven to completion, thus minimizing residual monomeric or oligomeric polymer precursors. Suitable curing conditions include sufficient pressure, temperature, time, and other process conditions for an appropriate higher molecular weight to be achieved. In some embodiments, curing the carbon nanotube-polymer composite is performed at a pressure of about one atmosphere. In some embodiments, curing the composite is performed at a pressure greater than one atmosphere, for example up to about 276 MPa, or for example in the range from about 690 kPa to about 6895 kPa. In some embodiments, curing the composite is performed at a pressure below atmospheric pressure. In some embodiments, curing the composite is performed at a temperature in the range from about 120° C. to about 350° C. In one embodiment, a carbon nanotube-polyester composite is cured at a temperature ranging from about 120° C. to about 275° C., for example from about 160° C. to about 250° C. In some embodiments, curing the composite is performed for a time in the range of 1 minute to several hours.

In one embodiment, a carbon nanotube-polyester composite having about 15 weight percent to about 80 weight percent carbon nanotubes, based on the weight of the carbon nanotubes and the polyester, is made according to a process as disclosed herein. In one embodiment, the carbon nanotube-polyester composite has about 51 weight percent to about 80 weight percent carbon nanotubes, based on the weight of the carbon nanotubes and the polyester. In one embodiment, the carbon nanotube-polyester composite contains carbon nanotubes in an amount ranging from about 55 weight percent to about 80 weight percent, based on the weight of the carbon nanotubes and the polyester. In one embodiment, the polyester comprises poly(butylene terephthalate).

In one embodiment, a carbon nanotube-polyamide composite having about 15 weight percent to about 80 weight percent carbon nanotubes, based on the weight of the carbon nanotubes and the polyamide, is made according to a process as disclosed herein. In one embodiment, the carbon nanotube-polyamide composite has about 51 weight percent to about 80 weight percent carbon nanotubes, based on the weight of the carbon nanotubes and the polyamide. In one embodiment, the carbon nanotube-polyamide composite contains carbon nanotubes in an amount ranging from about 55 weight percent to about 80 weight percent, based on the weight of the carbon nanotubes and the polyamide.

In one embodiment, a carbon nanotube-polyaramid composite having about 15 weight percent to about 80 weight percent carbon nanotubes, based on the weight of the carbon nanotubes and the polyaramid, is made according to a process as disclosed herein. In one embodiment, the carbon nanotube-polyaramid composite has about 51 weight percent to about 80 weight percent carbon nanotubes, based on the weight of the carbon nanotubes and the polyaramid. In one embodiment, the carbon nanotube-polyaramid composite contains carbon nanotubes in an amount ranging from about 55 weight percent to about 80 weight percent, based on the weight of the carbon nanotubes and the polyaramid.

In one embodiment, a carbon nanotube-polyacetal composite having about 15 weight percent to about 80 weight percent carbon nanotubes, based on the weight of the carbon nanotubes and the polyacetal, is made according to a process as disclosed herein. In one embodiment, the carbon nanotube-polyacetal composite has about 51 weight percent to about 80 weight percent carbon nanotubes, based on the weight of the carbon nanotubes and the polyacetal. In one embodiment, the carbon nanotube-polyacetal composite contains carbon nanotubes in an amount ranging from about 55 weight percent to about 80 weight percent, based on the weight of the carbon nanotubes and the polyacetal.

The carbon nanotube-polymer composites made by the processes disclosed herein comprise a mat of carbon nanotubes embedded in the condensation polymer produced from in situ polymerization of the polymer precursors. The in situ polymerization provides a well-consolidated composite structure in which the condensation polymer occupies the openings, or spaces, previously existent between adjacent nanotubes within the mat, that is, before the in situ polymerization step renders the mat of carbon nanotubes nonporous through formation of the condensation polymer within the mat. By "well-consolidated" is meant that the nanostructured sheet form of entangled carbon nanotubes and the condensation polymer derived from the polymer precursors are combined into a single unitary layer. While not wishing to be bound by theory, it may be that polymer precursors having a sufficiently low melt viscosity at the temperature of the polymerization step are able to navigate the tortuous paths within the carbon nanotube mat prior to or during polymer formation.

In contrast, higher viscosity films used for composite formation via hot-pressing fail to effectively penetrate the porous carbon nanotube mat structure and yield a void-filled material with distinct regions composed only of polymer or only of carbon nanotubes, even after extensive pressing at high pressure and temperature, as demonstrated by the Comparative Examples in the Experimental section below. Furthermore, even at high pressure (2000 psi, 13.8 MPa) the hot-pressing method for CNT mat compositing leaves voids in the CNT matrix, where incomplete penetration of the polymer into the carbon nanotube sheet structure can be observed. In contrast, at much lower pressure (320 psi, 2.2 MPa) the in-situ polymerization method generates a well-consolidated composite with minimal void space. The ability to consolidate this composite structure at lower pressure is of great importance for the fabrication of large-scale materials and a significant advantage of the in-situ polymerization process. Surface area increases significantly as the dimensions of an article are increased, and given that pressure is defined as force applied per unit area, the accessibility of lower pressures via the processes disclosed herein allows for ready fabrication of large-scale articles.

The carbon nanotube-polymer composites made by the processes disclosed herein can be useful in a variety of applications which take advantage of the good mechanical and conductivity properties provided by the composite. The high modulus and strength of the composite, in combination with its low areal density, provide an excellent structural material for use in many fields, including, but not limited to, ballistic protection, honeycomb core structures for aerospace applications, and structural automotive composites. Furthermore, the good conductivity of the composite enables its use in applications, including, but not limited to, energy storage, electromagnetic shielding, electrical transmission, and thermal transmission.

EXAMPLES

The processes described herein are illustrated in the following examples. From the above discussion and these examples, one skilled in the art can ascertain the essential characteristics of this invention, and without departing from the spirit and scope thereof, can make various changes and modifications to adapt it to various uses and conditions.

The following abbreviations are used in the examples: "° C." means degrees Celsius; "g" means gram; "psi" means pounds per square inch; "kPa" means kilopascal; "MPa" means megapascal; "GPa" means gigapascal; "m/s" means meters per second; "Ex" means Example, "Comp Ex" means Comparative Example; "Ave" means average, "CNT" means carbon nanotube; "cm" means centimeter(s); "µm" means microns; "in" means inch(es); "PBT" means poly(butylene terephthalate).

Analytical Methods:
  Tensile Analysis:
  Tensile testing of carbon nanotube (CNT) sheets, CNT-polymer composites of the Examples, and Comparative CNT-polymer composites was performed following the standard method ASTM D5034 "Breaking Strength and Elongation of Textile Fabrics—Grab Test" using an Instron Model 1122 Tensile Tester (Instron Corporation, Norwood, Mass.). Tested samples were of dimension of 2.5 cm×17.8 cm (1 in×7 in) and the gauge length was 7.6 cm (3 in). The surfaces of those grips used for tensile testing were covered by a 1 cm (0.39 in) thick layer of rubber. At least two composites were generated for each procedure outlined in Examples 2 and Comparative Examples A and C. The values reported for each Example and Comparative Example in Table 1 represent the average tensile properties of those composites. Tensile mechanical property values were derived from a stress-strain curve generated during tensile testing of each article.

Sound Wave Velocity Analysis:
  The velocity of a sound wave travelling through the CNT sheet or CNT-polymer composite medium of Example 1 and Comparative Examples A and B was measured using a Dynamic Modulus Tester (DMT PPM-R5) from Lawson-Hemphill (Swansea, Mass.) following the procedure described below and according to ASTM E494. The articles tested were of dimensions 17.8 cm×17.8 cm (7 in×7 in) and 10 point probes were positioned on the face and back surfaces of the article in 1 cm (0.39 in) increments across various angles of the article, as described below with reference to FIGS. 1A through 1F. The sound measurement waveform used had amplitude of 8 V and frequency of 60 Hz. The transmit time of a sound wave was plotted as a function of distance, with the slope of the resulting line representing the sound wave velocity through the given medium.

Figure 1A:
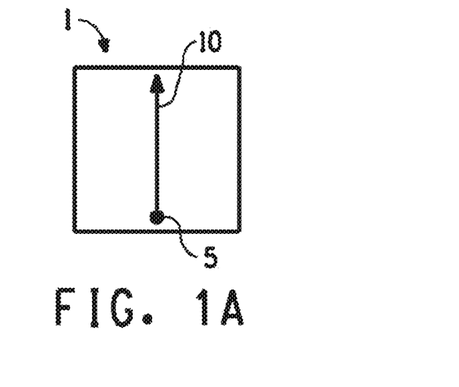
FIGS. 1A through 1F provide diagrams indicating the order of the sound velocity measurements and the directions in which the signals were measured for the articles of Example 1, Comparative Example A, and Comparative Example B FIG. 2 provides a diagram of the pressing package used to generate the composite of Example 1.
Figure 1B:
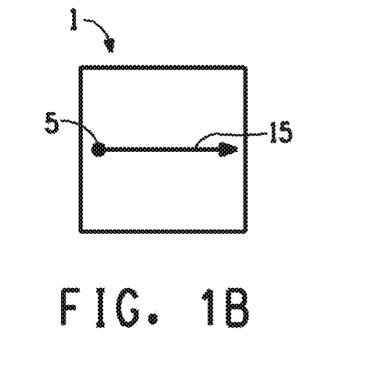
Figure 1C:
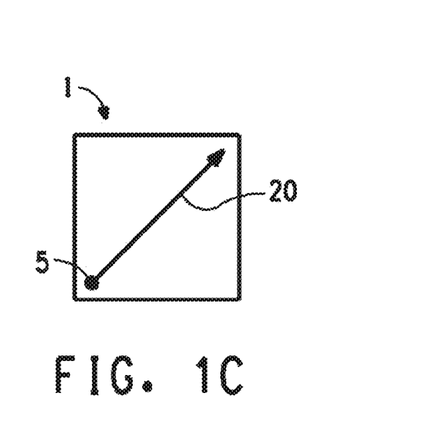
Figure 1D:
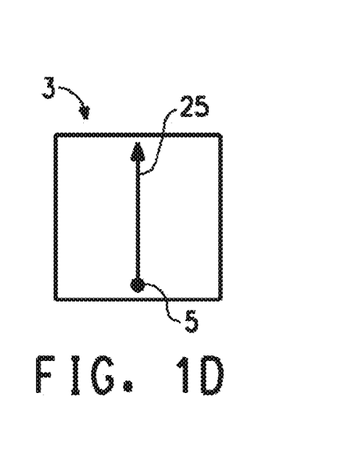
Figure 1E:
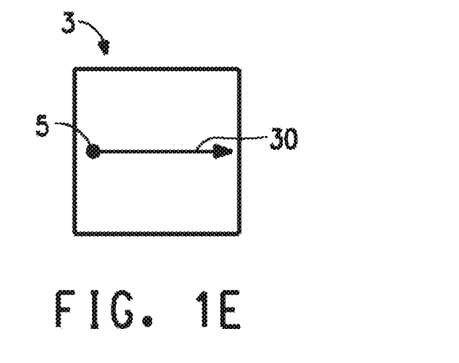
Figure 1F:
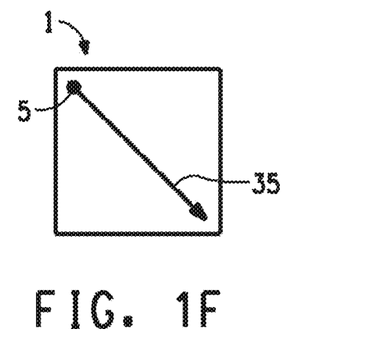

FIGS. 1A through 1F show the face 1 and the back 3, respectively, of the square article as generated in Example 1, Comparative Example A, and Comparative Example B. For each article, the face and back were identified as such for the purpose of the sound wave velocity measurements but were otherwise indistinguishable. In FIGS. 1A through 1F, each arrow represents a direction along which the sound wave velocity measurements were made from the point of origin of the sound wave indicated by circle 5. First, the article was placed on a flat surface with face 1 facing up, and sound velocity measurements were made across a midsection of face 1 initiating at the dark circular point of origin in FIG. 1A and following in the direction indicated by arrow 10. Second, measurements were made in the direction indicated by arrow 15 across a second midsection of face 1 and perpendicular to the initial measurement direction as indicated in FIG. 1B. Third, measurements were made across face 1 in a direction which bisected at 45 degrees the first and second directions of measurement, as indicated by arrow 20 in FIG. 1C. At this point in the testing, the article was flipped over so that the back 3 faced up, and sound velocity measurements were made across a midsection of the back 3 of the article in the direction indicated by arrow 25 in FIG. 1D. The measurement direction indicated by arrow 25 was the same as that indicated by arrow 10 although on opposite sides of the article. Next, measurements were made in the direction indicated by arrow 30 in FIG. 1E across a second midsection of the back 3 and perpendicular to the measurement direction indicated by arrow 25; the measurement direction indicated by arrow 30 was the same as that indicated by arrow 15 although on opposite sides of the article. Subsequently, the article was flipped over so that face 1 was once again facing up. Finally, sound velocity measurements were made in the direction indicated in FIG. 1F by arrow 35 across face 1 and perpendicular to the last measurement direction made across face 1.

Scanning Electron Microscopy Analysis:
  The morphology and thickness of CNT sheets and CNT-polymer composites were monitored in secondary electron mode using a model S4700 field emission scanning electron microscope (SEM) from Hitachi High-Technologies Corporation (Tokyo, Japan). Samples were embedded in epoxy resin from Buehler Ltd (Lake Bluff, Ill.). The embedded samples were then microtomed using a Reichert Ultracut S from Lecia Microsystems Inc. (Buffalo Grove, Ill.) and coated with evaporative carbon using an Auto 306 vacuum evaporator from BOC Edwards (Crawley, West Sussex, UK).

Areal Density:

Areal density is reported as weight per unit area and was determined by weighing an article of selected size.

Materials and Processing:

All commercial materials were used as received unless stated otherwise.

Carbon nanotube (CNT) sheets of dimension 15 in×15 in (38.1 cm×38.1 cm) and areal density of 10±2.5 grams per square meter were received from Nanocomp Technologies, Inc. (Merrimack, N.H.). Cyclic poly(butylene terephthalate) oligomer powder containing a polymerization catalyst (CBT® 160) was received from Cyclics Corporation (Schenectady, N.Y.). CBT® 160 powder exhibits an initial melt viscosity of approximately 0.5 Pa·s at 190° C. The CBT® 160 powder was reduced to fine powder using a model LB10S Laboratory Blender from Waring Commercial (Torrington, Conn.) and particles of dimension ≤850 μm were isolated for use as the polymer precursor in Example 1 via a #20 stainless steel testing sieve from VWR International LLC (Bridgeport, N.J.). Surlyn® 8920 films of thickness 0.0076 mm (0.0003 in) were used as received from E. I. du Pont de Nemours and Co. (Wilmington, Del.). Surlyn® 8920 is an ethylene copolymer containing approximately 15% by weight methacrylic acid that is approximately 60% neutralized by sodium cations and exhibits a viscosity of greater than 100 Pa·s at 190° C. Polytetrafluoroethylene (PTFE)-coated fiberglass laminate fabric (0.15 mm, 0.006 in thick), used as release paper was cut from a 91.4 cm (36 in) wide roll received from CS Hyde Company (Lake Villa, Ill.). Ultra-Clean™ Supremium Aluminum Foil of dimension 20.3 cm×20.3 cm (8 in×8 in) and 0.076 mm (0.003 in) thick was cut from a 45.7 cm (18 in) wide roll received from VWR International LLC (Bridgeport, N.J.). Aluminum sheets of dimension 20.3 cm×20.3 cm (8 in×8 in) and 0.64 cm (0.25 in) thick were used as platens during hot pressing. All cutting of CNT sheets and aluminum foil was performed using a No. 11 stainless steel scalpel from BD Bard-Parker™ (Franklin Lakes, N.J.). All cutting of Surlyn® 8920 film and PTFE-coated release paper foil was performed using N7250 series professional shears from Kia Scissors (Seattle, Wash.).

Hot-Pressing:

A manual press with two heated platens, model P-2150 from PHI (City of Industry, Calif.) was used to hot-press CNT sheets with cyclic poly(butylene terephthalate) oligomer powder to prepare carbon nanotube-poly(butylene terephthalate) composites via in situ polymerization. The manual press was also used to prepare comparative CNT-polymer composites using Surlyn® 8920 film.

Example 1

A carbon nanotube (CNT)-poly(butylene terephthalate (PBT)) composite of dimension 17.8 cm×17.8 cm (7 in×7 in) and containing 39.8 weight percent carbon nanotubes, based on the weight of the carbon nanotubes and the condensation polymer, was generated by hot-pressing a CNT sheet in the presence of cyclic poly(butylene terephthalate) oligomer powder (CBT® 160) according to the following procedure. A CNT sheet of dimension 17.8 cm×17.8 cm (7 in×7 in) was cut from a larger CNT sheet of dimension 38.1 cm (15 in×15 in) using a scalpel. A square of aluminum foil of dimension 25.4 cm×25.4 cm (10 in×10 in) was cut from a roll of foil using scissors. From that square, an aluminum foil frame was generated by removing a smaller square of dimension 17.8 cm×17.8 cm (7 in×7 in), positioned at equidistance from all sides of the larger square, using a scalpel to cut the foil. Three square plies of PTFE-coated fiberglass fabric of dimension 20.3 cm×20.3 cm (8 in×8 in) and one square ply of dimension 17.8 cm×17.8 cm (7 in×7 in) were cut from a roll of fabric using scissors.

Figure 2:
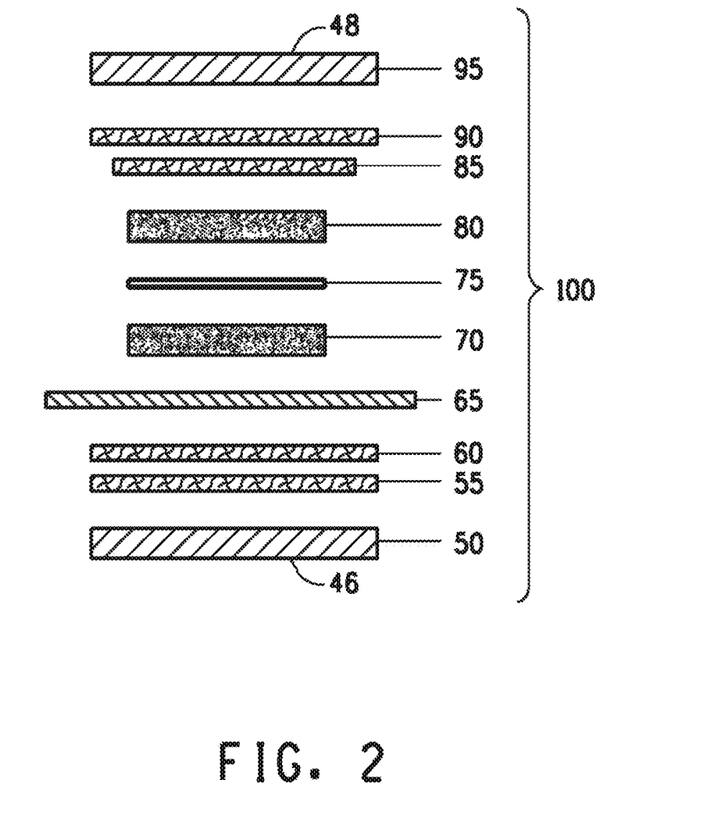

FIG. 2 shows the configuration of the pressing package 100 used to consolidate the carbon nanotube mat and powdered PBT polymer precursor into a CNT-PBT composite in the hot press. Arrow 46 indicates the face of the lower aluminum platen 50 of the pressing package that was in contact with the face of the lower platen (not shown) of the hot press during consolidation; arrow 48 indicates the face of the upper aluminum platen 95 of the pressing package that was in contact with the face of the upper platen (not shown) of the hot press during consolidation. Two plies 55 and 60 of PTFE-coated fiberglass fabric (20.3 cm×20.3 cm, 8 in×8 in) were stacked one on top of the other and placed on the aluminum platen 50 of dimension 20.3 cm×20.3 cm (8 in×8 in). The aluminum foil frame 65 was laid upon the top ply 60 such that a 17.8 cm×17.8 cm (7 in×7 in) area of ply 60 was exposed. Then 0.325 g of CBT® 160 powder was distributed evenly across the exposed surface of ply 60 within the boundaries of the aluminum foil frame 65 to form the first powder layer 70. A CNT sheet 75 was then placed on top of powder layer 70. Next, 0.324 g of CBT® 160 powder was evenly distributed across the CNT sheet 75 to form the second powder layer 80. The total mass of CBT® 160 powder used was 0.650 g. A third ply 85 of PTFE-coated fabric (17.8 cm×17.8 cm, 7 in×7 in) was placed on top of powder layer 80 within the boundaries of the aluminum foil frame 65. The final ply 90 of PTFE-coated fabric (20.3 cm×20.3 cm, 8 in×8 in) was laid on top of ply 85 and a second 20.3 cm×20.3 cm (8 in×8 in) aluminum platen 95 was placed on top of ply 90 to form the pressing package 100.

The pressing package was inserted into a hot press preheated to 200° C. The press was closed until contact was made between the upper press platen and the pressing package. This position was held for 2 minutes without applying pressure to the pressing package, in order to bring the pressing package to the temperature of the hot press and to begin melting the CBT® 160 powder. The pressure applied to the package was then increased to 323 psi (2.23 MPa) and held at that pressure for 60 minutes. During this period, the CBT® 160 powder melted and polymerized, generating PBT, and the CNT-PBT composite was formed. Pressure was then released, the pressing package (now containing the CNT-PBT composite) was removed from the press, and the pressing package was quenched to room temperature in a water bath. This composite was evaluated for sound wave velocity; results are shown in Table 2.

Example 2

A CNT-PBT composite of dimension 2.54 cm×17.8 cm (1 in×7 in) and containing 40.1 weight percent carbon nanotubes, based on the weight of the carbon nanotubes and the condensation polymer, was generated by hot-pressing a CNT sheet in the presence of CBT® 160 powder following the methodology of Example 1, with the following changes: 1) The CNT sheet was of dimension 2.54 cm×17.8 cm (1 in×7 in), 2) 0.029 g of CBT® 160 powder was distributed on each side of the CNT sheet (total powder mass=0.058 g, and 3) the aluminum frame had inner dimensions of 2.54 cm×17.8 cm (1 in×7 in) and outer dimensions of 20.3 cm×17.8 cm (1 in×8 in). This CNT-PBT composite was evaluated for tensile mechanical properties; results are shown in Table 1.

Figure 3:
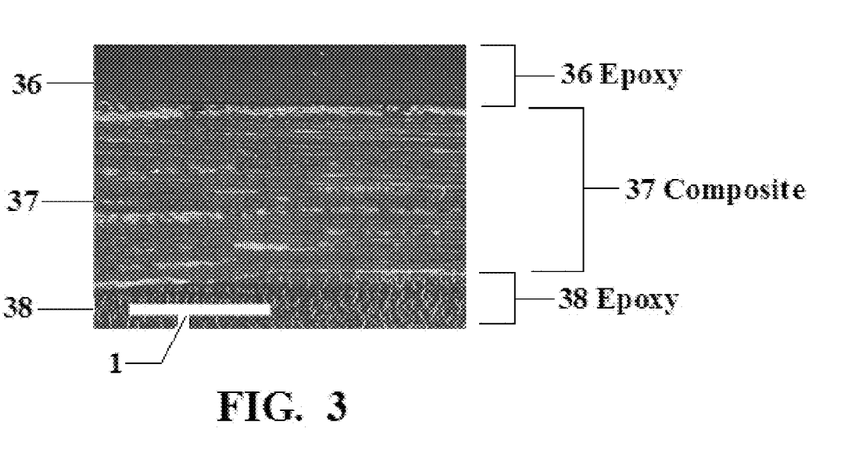
FIG. 3 provides a representation of a scanning electron microscope image of the edge of the composite of Example 2.

Following tensile mechanical evaluation of the composite, a section of dimension 1.27 cm×1.27 cm (0.5 in×0.5 in) was cut out and evaluated by SEM. This section was located outside of the instrument grip during tensile mechanical evaluation and was not subjected to tensile stress during the tensile mechanical evaluation. The composite was found to have a thickness of ~24 μm. FIG. 3 is a representation of an SEM image of the composite of Example 2 in cross-section; the scale bar represents a length of 20 μm. The composite 37 was embedded within epoxy layers 36 and 38 for the SEM analysis. Note that FIG. 3 shows a well-consolidated composite structure in which the carbon nanotube sheet structure is not distinct from the condensation polymer.

Comparative Example A

A carbon nanotube (CNT) sheet of dimension 17.8 cm×17.8 cm (7 in×7 in) was cut from a larger CNT sheet of dimension 15 in×15 in using a scalpel and was evaluated for sound wave velocity; results are given in Table 2.

A CNT sheet of dimension 2.54 cm×17.8 cm (1 in×7 in) was cut from the remainder of the large CNT sheet from Example 1 (originally of dimension 15 in×15 in) using a scalpel, and was evaluated for tensile mechanical properties. Results are shown in Table 1.

Figure 4:
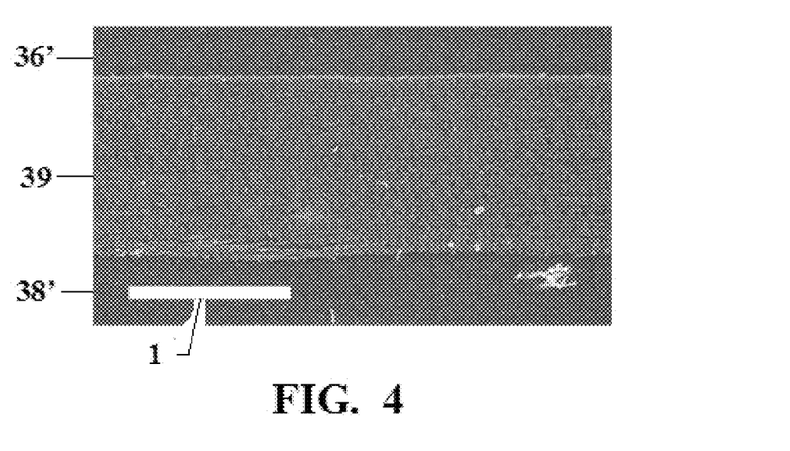
FIG. 4 provides a representation of a scanning electron microscope image of the edge of the composite of Comparative Example A.

A CNT sheet of dimension 1.27 cm×1.27 cm (0.5 in×0.5 in) was cut from the remainder of the large CNT sheet from Example 1 (originally of dimension 38.1 cm×38.1 cm (15 in×15 in) using a scalpel and was evaluated by SEM. The CNT sheet was found to have a thickness of ~22 μm. FIG. 4 is a representation of an SEM image of the carbon nanotube sheet of Comparative Example A in cross-section; the scale bar represents a length of 20 μm. The CNT sheet 39 was embedded within epoxy layers 36' and 38' for the SEM analysis.

Comparative Example B

A Comparative CNT-Surlyn® composite of dimension 17.8 cm×17.8 cm (7 in×7 in) and containing 35.8 weight percent carbon nanotubes, based on the weight of the carbon nanotubes and the Surlyn® used, was generated by hot-pressing a CNT sheet between two films of Surlyn® 8920 according to the following procedure. A CNT sheet of dimension 17.8 cm×17.8 cm (7 in×7 in) was cut from a larger CNT sheet of dimension 38.1 cm×38.1 cm (15 in×15 in) using a scalpel. Two square films of Surlyn® 8920 of dimension 20.3 cm×20.3 cm (8 in×8 in) were cut from a roll of film using scissors. Four square plies of PTFE-coated fiberglass fabric of dimension 20.3 cm×20.3 cm (8 in×8 in) were cut from a roll of fabric using scissors.

Figure 5:
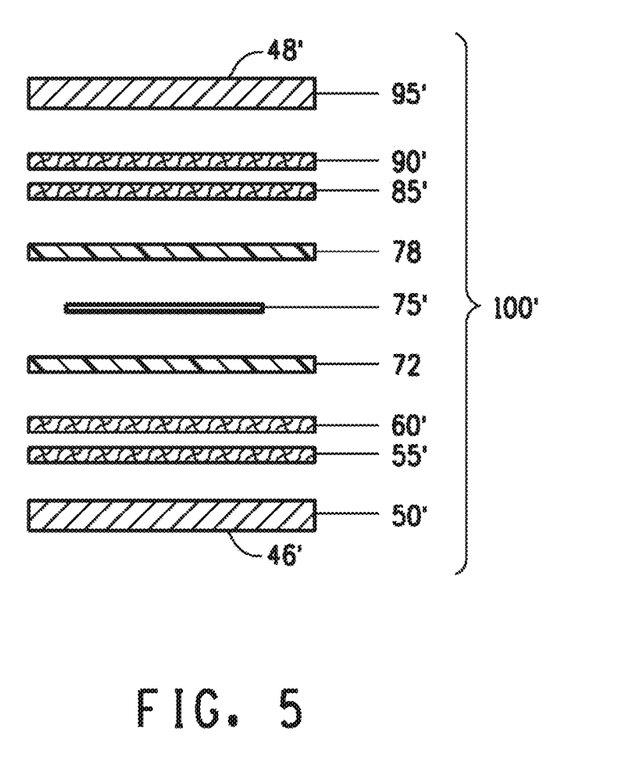
FIG. 5 provides a diagram of the pressing package used to generate the composite of Comparative Example B.

FIG. 5 shows the configuration of the pressing package 100' used to consolidate the carbon nanotube mat and Surlyn® films into a comparative CNT-Surlyn® composite in the hot press. Arrow 46' indicates the face of the lower aluminum platen 50' of the pressing package that was in contact with the face of the lower platen (not shown) of the hot press during consolidation; arrow 48' indicates the face of the upper aluminum platen 95' of the pressing package that was in contact with the face of the upper platen (not shown) of the hot press during consolidation. Two plies 55' and 60' of PTFE-coated fiberglass fabric were stacked one on top of the other and placed on the aluminum platen 50' of dimension 20.3 cm×20.3 cm (8 in×8 in). The first film 72 of Surlyn® 8920 was placed directly on the top ply 60'. The CNT sheet 75' was placed on top of film 72, followed by the second film 78 of Surlyn® 8920. The CNT sheet 75' was positioned so that none of its surface extended beyond those of films 72 and 78. A third ply 85' of PTFE-coated fabric was placed on top of film 78. The final ply 90' of PTFE-coated fabric was laid on top of ply 85', and a second 20.3 cm×20.3 cm (8 in×8 in) aluminum platen 95' was placed on top of ply 90' to form the pressing package 100'.

The pressing package was inserted into a hot press preheated to 200° C. The press was closed until contact was made between the upper press platen and the pressing package. This position was held for 10 minutes without applying pressure to the pressing package. The pressure applied to the package was then increased to 800 psi (5.52 MPa) and held at that pressure for 5 minutes. The pressure applied to the package was then increased to 1200 psi (8.27 MPa) and held at that pressure for 10 minutes. During this process the comparative CNT-polymer composite was formed. Pressure was then released, the pressing package (now containing the comparative composite) was removed from the press, and the pressing package was allowed to cool to room temperature before handling. Excess Surlyn® on the perimeter of this CNT-Surlyn® composite article was removed manually. This comparative composite was evaluated for sound wave velocity; results are given in Table 2.

Comparative Example C

A CNT-Surlyn® composite of dimension 2.54 cm×17.8 cm (1 in×7 in) was generated by hot-pressing a CNT sheet between two plies of Surlyn® 8920 following the methodology of Comparative Example B, with the following changes: 1) The CNT sheet was of dimension 2.54 cm×17.8 cm (1 in×7 in) and 2) the two Surlyn® 8920 plies were of dimension 5.08 cm×20.3 cm (2 in×8 in). This Comparative CNT-Surlyn® composite was evaluated for tensile mechanical properties; results are given in Table 1.

Figure 6:
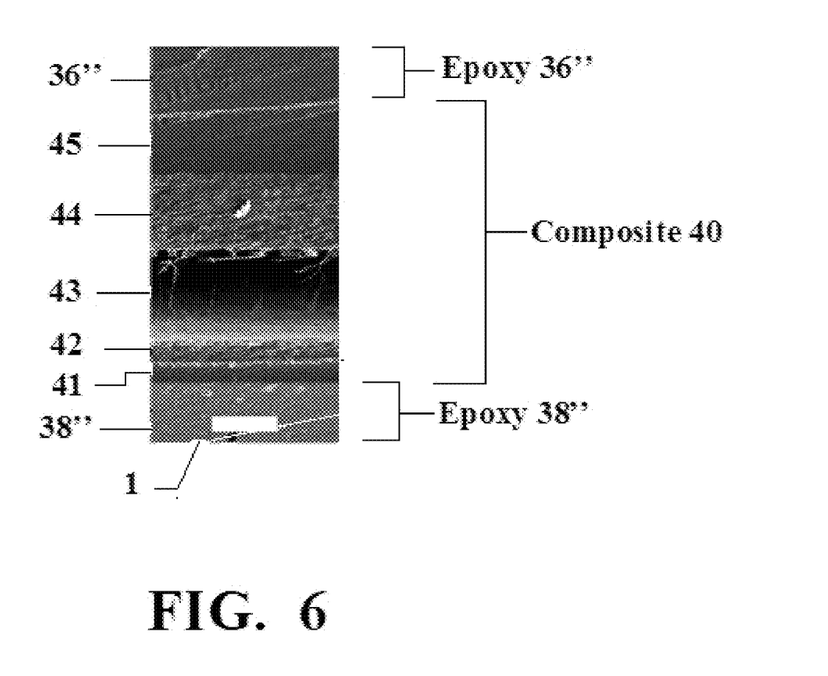
FIG. 6 provides a representation of a scanning electron microscope image of the edge of the composite of Comparative Example C.

Following tensile mechanical evaluation of the composite, a section of dimension 1.27 cm×1.27 cm (0.5 in×0.5 in) was cut out and evaluated by SEM. This section was located outside of the instrument grip during tensile mechanical evaluation and was not subjected to tensile stress during the tensile mechanical evaluation. The composite became slightly delaminated during preparation for SEM imaging. The composite of Comparative Example C was found to have a thickness of ~28 μm. In determining the thickness of this composite, the width of the delaminated region was subtracted as it did not contribute to the true thickness of the Comparative composite. FIG. 6 is a representation of an SEM image of the composite of Comparative Example C in cross-section; the scale bar represents a length of 10 μm. The composite 40 was embedded within epoxy layers 36" and 38" for the SEM analysis; the open space 43 within the carbon nanotube sections 42 and 44 is believed to result from SEM preparation and indicates some delamination. Note that FIG. 6 shows distinct layers 41 and 45 of Surlyn® 8920 outside the boundaries of the carbon nanotube sections 42 and 44, indicating poor consolidation of the Surlyn® polymer and carbon nanotube components of the Comparative composite.

TABLE 1

Tensile Mechanical Properties of the CNT Sheet of Comparative Example A and the CNT-Polymer Composites of Example 2 and Comparative Example B

| Example | Thickness (μm) | Modulus (GPa) | Strength to Break (MPa) | Elongation at Break (%) |
|---|---|---|---|---|
| 2 | ~24 | 7.94 ± 1.08 | 149.0 ± 54.7 | 4.3 ± 0.5 |
| Comp Ex A | ~22 | 3.99 ± 2.87 | 71.82 ± 28.32 | 5.7 ± 0.9 |
| Comp Ex B | ~28 | 3.99 ± 0.03 | 63.8 ± 19.2 | 4.4 ± 1.9 |

TABLE 2

Sound Wave Velocity Measurements of the CNT Sheet of Comparative Example A and the CNT-Polymer Composites of Example 1 and Comparative Example C

| Example | Ave Velocity (m/s) | Velocity (m/s) Measured in Indicated Direction * | | | | | |
|---|---|---|---|---|---|---|---|
| | | 10 | 15 | 20 | 25 | 30 | 35 |
| 1 | 3408 | 3740 | 2856 | 3602 | 3624 | 3208 | 3415 |
| Comp Ex A | 3305 | 3175 | 2965 | 3532 | 3132 | 3737 | 3290 |
| Comp Ex C | 2494 | 2411 | 3153 | 2133 | 2164 | 2607 | — |

* See FIGS. 1A through 1F for diagrams showing the directions in which the signals were measured The data presented in Table 1 demonstrates the significant mechanical enhancement afforded to the CNT-PBT composite by the in situ polymerization of PBT oligomer in the presence of the carbon nanotube mat to provide a well-consolidated composite comprising nanostructured sheet form of entangled carbon nanotubes embedded within polybutylene terephthalate polymer (Example 2). Specifically, the stiffness and strength of the composite were both increased by approximately 100% over that of the as-received polymer-free mat of carbon nanotubes (Comparative Example A). In contrast, attempts to produce a consolidated composite by applying Surlyn® film to a CNT mat (Comparative Example B) yielded a material with mechanical properties statistically indistinguishable from the as-received carbon nanotube mat and which was not well-consolidated.

Such improvement in the mechanical properties of the Example 2 composite is translated into an increased velocity of sound waves through this material, as shown by the data in Table 2. Most of the measurements showed higher sound velocity within the CNT-PBT composite than within the carbon nanotube sheet or the Comparative Example C composite. Sound wave velocity through a medium is dependent on both the stiffness and density of the medium through the relationship shown in Equation 1. Here, E represents the Young's modulus of the material, while ρ represents its density. We note that while significant increases in the stiffness of a medium can improve sound wave velocity (for example, a 100% increase in E is equivalent to a 41% increase in sound wave velocity), concurrent increases in density can mitigate that improvement (a 100% increase in ρ is equivalent to a 29% decrease in sound wave velocity). As such, the near 100% increase in Young's modulus from the as received carbon nanotube mat (Comparative Example A) to the CNT-PBT composite of Example 2 is not fully realized in the measured sound wave velocities, given the concurrent increase in density of the composite due to the presence of poly butylene terephthalate polymer within the carbon nanotube mat.

$$\text{Velocity}_{sound} = \frac{E}{\rho}. \qquad \text{Equation 1}$$

Figure 7:
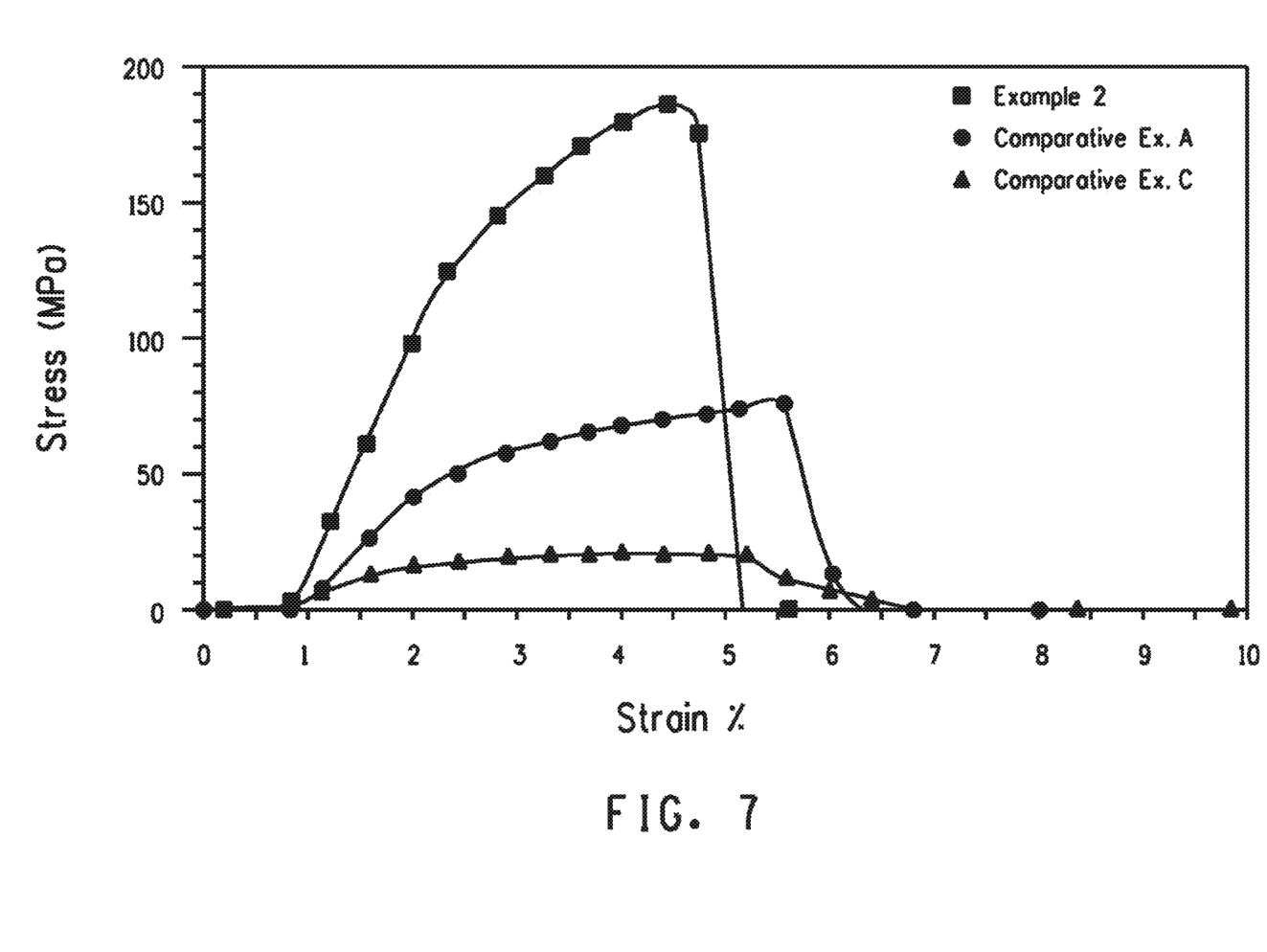
FIG. 7 provides a graphical representation of the stress-strain curve for the composites of Example 2, Comparative Example A, and Comparative Example C.

Stress-strain curves for the CNT-PBT composite of Example 2 (squares), the CNT sheet of Comparative Example A (circles), and the composite of Comparative Example C (triangles) are shown in FIG. 7. FIG. 7 is a graphical representation showing the stress applied to an article as a function of strain from an original gauge length of 7.62 cm (3 in). The stiffness and strength of the CNT-PBT composite (Example 2) were both approximately 110% above that of the CNT sheet (Comparative Example A), the untreated precursor to the composite. Such increases apparently result from the thorough penetration of PBT into the CNT matrix to form the well-consolidated composite. In contrast, the tensile mechanical properties of the CNT-Surlyn® composite (Comparative Example C) did not improve over those of Comparative Example A to a statistically significant degree. The decreased stiffness and strength of the Comparative composite are believed to result from the poor degree of Surlyn® resin impregnation into the CNT matrix, which increased the cross-sectional area of the composite and effectively lowered its tensile properties. Increased stiffness and strength are desired for composites used in ballistic applications as these characteristics can provide better performance against ballistic threats.

What is claimed is:

1. A process comprising the steps:
    (a) providing a porous mat comprising carbon nanotubes having an average longest dimension in the range of 1 micron to 1000 microns, wherein at least a portion of the carbon nanotubes are entangled;
    (b) contacting the mat with one or more condensation polymer precursors, and optionally a catalyst;
    (c) polymerizing the one or more polymer precursors in the presence of the mat at a temperature in the range of about 180° C. to about 360° C. to form a nonporous carbon nanotube-polymer composite comprising a mat of carbon nanotubes embedded in a condensation polymer produced from the polymer precursors, wherein the carbon nanotubes are present in the composite in an amount ranging from about 15 weight percent to about 80 weight percent, based on the weight of the carbon nanotubes and the condensation polymer; and
    (d) optionally, curing the carbon nanotube-polymer composite.

2. The process of claim 1, wherein the carbon nanotubes comprise single wall nanotubes, multiwall nanotubes, or mixtures thereof.

3. The process of claim 2, wherein the carbon nanotubes are randomly oriented.

4. The process of claim 2, wherein at least a portion of the carbon nanotubes are aligned substantially parallel to one another.

5. The process of claim 1, wherein the mat has a thickness in the range of about 10 microns to about 50 microns.

6. The process of claim 1, wherein the mat has an areal density in the range of about 5 grams per square meter to about 100 grams per square meter.

7. The process of claim 1, wherein the carbon nanotubes are present in the carbon nanotube-polymer composite in an amount ranging from about 51 weight percent to about 80 weight percent, based on the weight of the carbon nanotubes and the condensation polymer.

8. The process of claim 1, wherein the condensation polymer produced from the polymer precursors comprises a polyester, a polyamide, a polyaramid, or a polyacetal.

9. The process of claim 8, wherein the condensation polymer comprises a polyester.

10. The process of claim 1, wherein the condensation polymer precursors comprise monomers, oligomers, or mixtures of monomers and oligomers.

11. The process of claim 10, wherein the condensation polymer precursor comprises cyclic poly(butylene terephthalate) oligomer.

12. The process of claim 1, wherein the polymerizing is performed at a pressure below atmospheric pressure.

13. The process of claim 1, wherein the polymerizing is performed at a pressure in the range of about 170 kPa to about 3500 kPa.

14. The process of claim 1, wherein the polymer precursor has a melt viscosity in the range of about 0.1 $s^{-1}$ to about 10 $s^{-1}$ at a temperature in the range of about 180° C. to about 360° C.

15. A carbon nanotube-polymer composite made according to a process comprising the steps:
  (a) providing a porous mat comprising carbon nanotubes having an average longest dimension in the range of 1 micron to 1000 microns, wherein at least a portion of the carbon nanotubes are entangled;
  (b) contacting the mat with one or more condensation polymer precursors, and optionally a catalyst;
  (c) polymerizing the one or more polymer precursors in the presence of the mat at a temperature in the range of about 180° C. to about 360° C. to form a nonporous carbon nanotube-polymer composite comprising a mat of carbon nanotubes embedded in a condensation polymer produced from the polymer precursors, wherein the carbon nanotubes are present in the composite in an amount ranging from about 15 weight percent to about 80 weight percent, based on the weight of the carbon nanotubes and the condensation polymer; and
  (d) optionally, curing the carbon nanotube-polymer composite;
wherein the condensation polymer precursors comprise cyclic poly(butylene terephthalate) oligomer.

16. A carbon nanotube-polymer composite made according to a process comprising the steps:
  (a) providing a porous mat comprising carbon nanotubes having an average longest dimension in the range of 1 micron to 1000 microns, wherein at least a portion of the carbon nanotubes are entangled;
  (b) contacting the mat with one or more condensation polymer precursors, and optionally a catalyst;
  (c) polymerizing the one or more polymer precursors in the presence of the mat at a temperature in the range of about 180° C. to about 360° C. to form a nonporous carbon nanotube-polymer composite comprising a mat of carbon nanotubes embedded in a condensation polymer produced from the polymer precursors, wherein the carbon nanotubes are present in the composite in an amount ranging from about 15 weight percent to about 80 weight percent, based on the weight of the carbon nanotubes and the condensation polymer; and
  (d) optionally, curing the carbon nanotube-polymer composite;
wherein the condensation polymer comprises a polyester.

17. The composite of claim 16, wherein the polyester is polybutylene terephthalate.

* * * * *